(12) United States Patent
Oosterholt

(10) Patent No.: US 9,418,706 B2
(45) Date of Patent: Aug. 16, 2016

(54) METHOD AND APPARATUS FOR DISPLAYING A PLURALITY OF ITEMS

(75) Inventor: Ronaldus Hermanus Theodorus Oosterholt, Weert (NL)

(73) Assignee: Koninklijke Philips N.V., Eindhoven (NL)

( * ) Notice: Subject to any disclaimer, the term of this patent is extended or adjusted under 35 U.S.C. 154(b) by 1607 days.

(21) Appl. No.: 13/055,028

(22) PCT Filed: Jul. 15, 2009

(86) PCT No.: PCT/IB2009/053058
§ 371 (c)(1),
(2), (4) Date: Jan. 20, 2011

(87) PCT Pub. No.: WO2010/010483
PCT Pub. Date: Jan. 28, 2010

(65) Prior Publication Data
US 2011/0131530 A1 Jun. 2, 2011

(30) Foreign Application Priority Data

Jul. 23, 2008 (EP) .................................. 08160930

(51) Int. Cl.
*G06F 3/00* (2006.01)
*G06F 3/048* (2013.01)
*G11B 27/34* (2006.01)
*G06F 3/0482* (2013.01)
*G11B 27/034* (2006.01)

(52) U.S. Cl.
CPC .............. *G11B 27/34* (2013.01); *G06F 3/0482* (2013.01); *G11B 27/034* (2013.01)

(58) Field of Classification Search
None
See application file for complete search history.

(56) References Cited

U.S. PATENT DOCUMENTS

| | | | | |
|---|---|---|---|---|
| 5,848,399 A * | 12/1998 | Burke | | 705/27.2 |
| 5,926,178 A * | 7/1999 | Kurtenbach | | 715/834 |
| 6,236,400 B1 * | 5/2001 | Guerrero | | 715/841 |
| 6,448,987 B1 * | 9/2002 | Easty et al. | | 715/834 |
| 6,466,918 B1 * | 10/2002 | Spiegel et al. | | 705/7.29 |
| 6,775,659 B2 * | 8/2004 | Clifton-Bligh | | |
| 6,990,638 B2 | 1/2006 | Barksdale et al. | | |
| 7,035,864 B1 * | 4/2006 | Ferrari et al. | | |
| 7,962,488 B2 * | 6/2011 | Kudo | | 707/737 |
| 8,549,407 B2 * | 10/2013 | O'Neil Garcia | | 715/738 |
| 2002/0045960 A1 | 4/2002 | Phillips et al. | | |
| 2003/0197740 A1 * | 10/2003 | Reponen | | 345/810 |
| 2004/0153371 A1 * | 8/2004 | Razumov | | 705/26 |
| 2004/0155907 A1 * | 8/2004 | Yamaguchi et al. | | 345/810 |

(Continued)

FOREIGN PATENT DOCUMENTS

| | | | |
|---|---|---|---|
| JP | 2005078143 A | 3/2005 | |
| JP | 2008009781 A | 1/2008 | |

(Continued)

*Primary Examiner* — Yongjia Pan

(57) ABSTRACT

A method of displaying a plurality of items is described. The items are arranged in a plurality of hierarchical levels, each of the hierarchical levels comprises a plurality of sets of items, each set comprising at least one of the plurality of items and each item has associated therewith at least one other item in another hierarchical level. An item within a first hierarchical level is selected (step 206), at least two sets of items of at least one second hierarchical level (the second hierarchical level being a level lower than the first hierarchical level) are arranged in an order determined by the selected one of the items (step 208) and the ordered sets of items are displayed (step 210).

19 Claims, 2 Drawing Sheets

(56) References Cited

U.S. PATENT DOCUMENTS

| | | |
|---|---|---|
| 2005/0038819 A1 | 2/2005 | Hicken et al. |
| 2005/0044509 A1* | 2/2005 | Hunleth et al. ............... 715/834 |
| 2005/0086611 A1* | 4/2005 | Takabe et al. ................. 715/823 |
| 2006/0059425 A1 | 3/2006 | Anspach et al. |
| 2007/0074118 A1* | 3/2007 | Robbin et al. ................. 715/727 |
| 2007/0136286 A1* | 6/2007 | Webster et al. .................... 707/7 |
| 2008/0005701 A1 | 1/2008 | Park et al. |
| 2008/0059911 A1 | 3/2008 | Kulo et al. |
| 2008/0091553 A1* | 4/2008 | Koski .............................. 705/26 |
| 2009/0044148 A1 | 2/2009 | Shirota |
| 2009/0150791 A1* | 6/2009 | Garcia .......................... 715/738 |
| 2009/0210791 A1* | 8/2009 | Proehl et al. .................. 715/720 |
| 2011/0231760 A1* | 9/2011 | Nelson .......................... 715/716 |

FOREIGN PATENT DOCUMENTS

| | | |
|---|---|---|
| WO | 0219203 A2 | 3/2002 |
| WO | 2007007166 A2 | 1/2007 |
| WO | 2007046343 A1 | 4/2007 |

\* cited by examiner

| 302 | 304 | 306 | 300 |

| Artist | Album | 314 | Tracks |
|---|---|---|---|
| Beck | Blonde on Blonde | | track 1 |
| BoB Dylan ← 308 | Dylan & the Dead | | track 2 |
| ELO | Highway 61 | 318 | track 3 |
| Everlast | 310 | Mashville Skyline | track 4 |
| Foo Fighters | | Self Portrait | track 5 |
| Kate and Anna McGarrigle | | Slow Train Coming | track 6 |
| Prodigy | | | track 7 |
| Ryan Adamx | | All over the world | track 8 |
| Stereophonics | | Discovery | track 1 |
| | | | track 2 |
| | | | 316 |

FIG. 3a

| Artist | Album | Tracks |
|---|---|---|
| Beck | Blonde on Blonde | track 1 |
| BoB Dylan | 320 — Dylan & the Dead | track 2 |
| ELO | Highway 61 | track 3 |
| Everlast | Mashville Skyline | track 4 |
| Foo Fighters | Self Portrait | track 5 |
| Kate and Anna McGarrigle | Slow Train Coming | track 6 |
| Prodigy | | track 7 |
| Ryan Adamx | All over the world | track 8 — 322 |
| Stereophonics | Discovery | 323 |
| | | track 2 |
| | | track 3 |
| | | track 4 |
| | | track 5 |
| | | track 6 |

FIG. 3b

| Artist | Album | Tracks |
|---|---|---|
| Beck | Blonde on Blonde | track 1 |
| BoB Dylan | Dylan & the Dead | track 2 |
| ELO | 326 — Highway 61 | track 3 |
| Everlast | Mashville Skyline | track 4 — 324 |
| Foo Fighters | Self Portrait | track 5 |
| Kate and Anna McG | Slow Train Coming | track 6 |
| Prodigy | | track 7 |
| Ryan Adamx | All over the world | |
| Stereophonics | Discovery | track 1 |
| | | track 2 |

FIG. 3c

METHOD AND APPARATUS FOR DISPLAYING A PLURALITY OF ITEMS

FIELD OF THE INVENTION

The present invention relates to a method and apparatus for displaying a plurality of items.

BACKGROUND TO THE INVENTION

Many electronic devices now exist that include a display for displaying a plurality of items allowing the user to browse and peruse the plurality of items. For example, electronic devices include portable apparatus such as mobile terminals, personal digital assistants, satellite navigation systems, portable media players such as iPods® etc. Other electronic devices include personal computers, laptops, televisions, any device that includes an audio/video content library, and any device that includes, for example, a graphical user interface.

Due to the increasing popularity and demand for these devices, there is an increased desire for an easy to use display for browsing items. Most devices use 'panel' browsers for representing and displaying items. The browsers provide a hierarchical structure for browsing items in which a first list of items is displayed on the display and, upon selection of an item from the first list, a second list of items is displayed on the display in place of the first list. An example of such a system is described in US Patent Application No. 2008/0059911. For example, a first menu consisting of a list of artists is displayed on the display and, upon selection of one of the artists, a second menu consisting of a list of albums by the selected artist is displayed on the display in place of the list of artists. Further, upon selection of one of the albums from the list, a third menu consisting of a list of songs on the selected album is displayed in place of the list of albums. This means that each subsequent level of the display is filtered according to the selection made on the upper level.

The problem associated with the existing browsers for displaying is that they force a sequential means of access from the top of the hierarchy (artist in the example) traversing down through the nodes until reaching the intended item (a song in the example). This can be time consuming and confusing for a user since the user is required to browse all items in each menu in order to reach the intended item. Further, if once the user has reached the intended item, the user wishes to select a different item from the first menu, the user is required to navigate back through each of the menus in order to return to the first.

SUMMARY OF INVENTION

The present invention seeks to provide a method whereby the interaction with a browser is improved to provide an intuitive, flexible, easy to use browser for displaying a plurality of items, allowing such items to be browsed simply and efficiently.

This is achieved, according to one aspect of the present invention, by a method of displaying a plurality of items, the items arranged in a plurality of hierarchical levels, each of the hierarchical levels comprises a plurality of sets of items, each set comprising at least one of the plurality of items, each item having associated therewith at least one other item in another hierarchical level, the method comprising the steps of: selecting one item within a first hierarchical level; arranging at least two sets of items of at least one second hierarchical level in an order determined by the selected one of the items, the second hierarchical level being a level lower than the first hierarchical level; and displaying the ordered sets of items of the at least one second hierarchical level.

This is also achieved, according to a second aspect of the present invention, by apparatus for displaying a plurality of items, the items arranged in a plurality of hierarchical levels, each of the hierarchical levels comprises a plurality of sets of items, each set comprising at least one of the plurality of items, each item having associated therewith at least one other item in another hierarchical level, the apparatus comprising: a selector for selecting one of the displayed items within a first hierarchical level; a display driver for arranging at least two sets of items of at least one second hierarchical level in an order determined by the selected one of the displayed items, the second hierarchical level being a level lower than the first hierarchical level; and a display for displaying the ordered sets of items of the at least one second hierarchical level.

In this way, a user can quickly browse through the items to reach the intended item since each hierarchical level or list of items is rearranged based on the item that is selected by the user. The items of the lower levels are not filtered according to the selection on the higher level, but ordered according to the higher level. This means that after selecting one of the displayed items within the first hierarchical level, the user can go to a lower hierarchical level without being required to go back to the first hierarchical level in order to reach the intended item. The aligned arrangement of hierarchical levels provides the user with direct access at any level of the hierarchy at any time thus improving the interaction with the browser.

The at least two sets of items of the at least one second hierarchical level may be ordered such that a set comprising items associated with the selected one of the items is listed first.

At least one hierarchical level higher than the second hierarchical level may be displayed as well as the ordered sets of items of at least one second hierarchical level.

This allows the user to see a variety of levels, making it easy for the user to find an intended item. Further, a user is not required to re-navigate through different menus to find an intended item.

The method may further comprise the steps of: selecting one of the items within the at least one second hierarchical level; and indicating one of the items in a hierarchical level higher than the second hierarchical level by highlighting one of the items associated with the selected one of the items within the at least one second hierarchical level.

In this way, when a user makes a selection of an item from a lower level, the user can instantaneously see the items that are associated with that selected item from the higher levels making it quicker and easier for a user to find an intended item. Further, if a user wants to browse the entire collection on a certain level (e.g. on a song level in the case of a music browser), the user can simply browse that level in its entirety and as the user browses the items (or tracks) in that level, the lower levels may, for example, shift as the user crosses a 'boundary' in the level that the user is browsing. In this way, the user is not forced to make a navigational 'detour' when the user, for example, wants to browse songs from one album to the next. The user simply can continue scrolling the songs in the songs level and when the user crosses an album boundary, the adjacent associated columns adapt themselves automatically.

The steps of arranging at least two sets of items of the at least one second hierarchical level and displaying the ordered sets of items may be automatic upon selection of the item.

In this way, the at least one second hierarchical level is automatically re-ordered depending on the users selection of item from the first hierarchical level. This means that a user can observe the items in the lower (second) hierarchical level before making a selection in one of them, making it quicker for the user to find an intended item. For example, after selection of an item from the higher (first) hierarchical level, a user can see whether or not the intended item appears in the lower (second) hierarchical level without having to scroll through each lower hierarchical level. In this way, if the intended item does not appear in the lower hierarchical level, the user can simply and efficiently make a new selection from the higher hierarchical level and does not need to first scroll back through each lower hierarchical level in order to return to the higher hierarchical level. Instead the items of the lower hierarchical level are automatically re-ordered or re-aligned based on the user's new selection from the higher hierarchical level.

BRIEF DESCRIPTION OF DRAWINGS

For a more complete understanding of the present invention, reference is now made to the following description taken in conjunction with the accompanying drawings in which:
FIGS. 3 a-c are illustrative examples of the apparatus and method for displaying a plurality of items.

DETAILED DESCRIPTION OF EMBODIMENTS OF THE INVENTION

Figure 1:
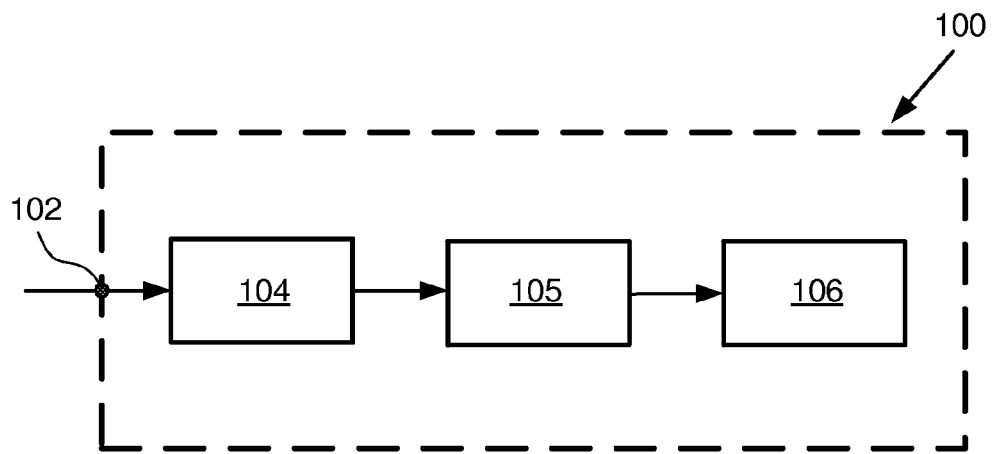
FIG. 1 is a simplified schematic of apparatus for displaying a plurality of items.
Figure 2:
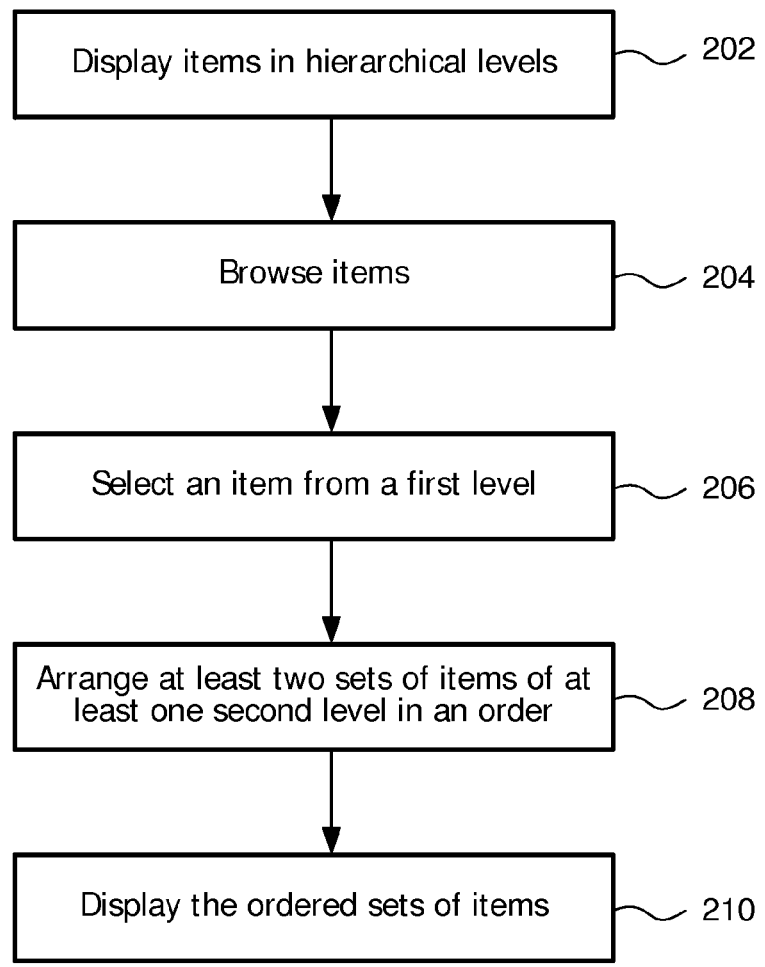
FIG. 2 is a flowchart of a method of displaying a plurality of items.

With reference to FIG. 1, the apparatus 100 comprises an input terminal 102 for input into a selector 104. The output of the selector is connected to the input of a display driver 105. The output of the display driver 105 is connected to the input of a display 106.

The display 106 displays a plurality of items arranged in a plurality of hierarchical levels (step 202) such that some items are visible in the display area and other items are not visible. Hierarchical levels are an arrangement of items in a ranked or graduated series that ranges from the highest hierarchical level to the lowest hierarchical level. Each of the plurality of hierarchical levels comprises at least one of the plurality of items such that certain items appear in a certain hierarchical level ranging from the highest hierarchical level to the lowest hierarchical level. The hierarchical levels of items may be arranged, for example, adjacent to one another on the display 106 such that the items in each of the hierarchical levels are listed vertically on the display 106. Each item has associated with it at least one other item in another hierarchical level.

A user can browse the items within each of the hierarchical levels displayed on the display 106 by means of, for example, a remote control, a touch-screen, softkeys or any other such interaction means (step 204). A user can select an item using the same interaction means.

The selector 104 receives a user input via the input terminal 102 and based on the input received, the selector 104 selects one of the displayed items within a first hierarchical level (step 206).

The selector 104 outputs the selected one of the displayed items to the display driver 105. The display driver 105 arranges at least two sets of items of at least one second hierarchical level in an order determined by the selected one of the displayed items (step 208). For example, the display driver 105 arranges at least two sets of items of at least one second hierarchical level in an order such that sets comprising items associated with the selected one of the items are listed first. The second hierarchical level is a level lower than the first hierarchical level. For example, the second hierarchical level may be the level displayed immediately after the first hierarchical level or a level displayed lower again. Also, the second hierarchical level may be one or more hierarchical levels lower than the first hierarchical level. The display driver 105 inputs the ordered sets of items into the display 106 and the display 106 displays the ordered sets of items (step 210).

When the selector 104 selects an item of a higher level that does not correspond to an item in the set of items that are listed first in a lower level, the display driver 105 moves the set of items listed first in the lower level and replaces it with the correct set of items (comprising an item associated with the selected item), for display on the display 106. In other words, the display driver 105 re-orders the sets of items that are to be displayed. In this way, an item change on a higher level forces an alignment on the lower levels.

The display driver 105 arranges at least two sets of items of the at least one second hierarchical level in an order and the display 106 displays the ordered sets of items automatically upon the selector 104 selecting one of the browsed items within the first hierarchical level.

Alternatively, or in addition, the selector 104 receives a user input via the input terminal 102 and based on the input received, the selector 104 selects one of the displayed items within the at least one second hierarchical level (i.e. in a lower hierarchical level).

The selector 104 inputs the selected one of the displayed items into the display driver 105. The display driver 105 determines one of the items in a hierarchical level higher than the second hierarchical level that is associated with the selected one of the items and applies a highlight to the determined item. The display driver 105 outputs the highlighted item to the display 106.

The display 106 displays the highlighted item in this higher hierarchical level whilst also displaying at least some items in other hierarchical levels. This means that when an item of a lower level is selected that does not correspond to a highlighted item on a higher level, the highlight of the higher level is moved to the correct item. Highlighting an item distinguishes the item from other items by making its appearance different. Highlighting includes, for example, making an item a different color, shading the area around an item, displaying a box around an item, displaying an icon such as an arrow indicating an item, making an item bigger than the other items so that it gives the illusion of being closer to the user, or any other methods for highlighting.

The apparatus and method will now be described with reference to all the Figures, including the illustrated example shown in FIGS. 3 a-c. With reference to FIGS. 3 a-c, a music browser 300 comprises a first hierarchical level 302, a second hierarchical level 304 and a third hierarchical level 306. Each hierarchical level comprises a plurality of items; the first hierarchical level 302 comprises a plurality of artists, the second hierarchical level 304 comprises a plurality of albums, and the third hierarchical level 306 comprises a plurality of tracks.

The first hierarchical level 302 is the highest hierarchical level. With reference to FIG. 3a, when in the first hierarchical level 302, a user can browse the items (artists) in the first hierarchical level 302 using, for example, a remote control, touch-screen, softkeys or any other such interaction means. When a user is browsing the first hierarchical level (artist) 302 (step 204), the items in the first hierarchical level 302 are highlighted by them appearing brighter (for example, white as opposed to grey) in comparison to the items in other levels (album and track) and by them appearing enlarged in size in comparison to the items of the other levels such that they appear to be closer to the user. When a user scrolls through the items, a highlight 308 in the form of a box around the item is moved. For example, when a user scrolls to the artist "Bob Dylan", the highlight 308 is moved such that it appears around the artist "Bob Dylan".

The user selects the highlighted item "Bob Dylan" indicated by the highlight 308 from the first hierarchical level 302 (step 206). Upon selection of the highlighted item 308 from the first hierarchical level 302, the second hierarchical level 304 repositions its sets of items such that the set of albums 310 belonging to the selected highlighted item 308 align correctly with the first hierarchical level 302 (step 208). In other words, upon selection of the highlighted item 308, the set of albums 310 belonging to the selected highlighted item 308 are arranged to appear first in the second hierarchical level 304. The third hierarchical level 306 also repositions its items such that the sets of tracks of the albums 310 of the selected highlighted item 308 align correctly with the first and second hierarchical levels 302, 304 (step 208). For example, the set of tracks 312 belonging to the first album 314 of the selected item 308 appear first in the third hierarchical level 306, the set of tracks 316 belonging to the second album 318 of the selected item 308 appear second in the third hierarchical level 306 and so on.

With reference to FIG. 3b, when a user browses the second hierarchical level 304 (in this case album), the items in the second hierarchical level 304 are highlighted by them appearing brighter and larger than those in the other levels (artist and track). When a user scrolls through the items, a highlight 320 is moved. For example, the user scrolls to the album "Dylan & the Dead", which is then highlighted.

The same process takes place if the user is browsing the items (tracks) of the third hierarchical level 306. For example, when the user scrolls through the items of the third hierarchical level and "Track 1" 322 of the "Dylan & the Dead" album crosses the boundary 323, the highlight 320 in the second hierarchical level 304 is moved from the first album, "Blonde on Blonde" to the second album "Dylan & the Dead". In other words, the second hierarchical level 304 realigns its items (albums) so that the album highlighted in the second hierarchical level 304 is the album associated with the currently selected/highlighted track 322 in the third hierarchical level 306.

With reference to FIG. 3c, when the user moves the highlight 324 in the third hierarchical level 306 from, for example, track 7 of 'Dylan & The Dead" to track 4 of "Highway 61", the highlight 326 in the second hierarchical level 304 automatically moves from "Dylan & the Dead" to "Highway 61".

In this way, a user intuitively knows which items to select in order to find the intended item as at least some of the items in each list (artist, album, and tracks) are displayed according to a user's selection. For example, upon selection of an item from a first hierarchical level (e.g. "artist"), the sets of items in at least one second level, lower than the first, (e.g. "album" and/or "track") are displayed in an order based on the selected item. A user can quickly browse through the items to reach the intended item since each hierarchical level or list of items is rearranged based on the item that is selected by the user. The items of the lower levels are not filtered according to the selection on the higher level, but ordered according to the higher level. This means that the user need not scroll through menu after menu to find the intended item, but can instead instantly see each item providing a much simpler and efficient way of browsing items. The aligned arrangement of hierarchical levels provides the user with direct access at any level of the hierarchy at any time thus improving the interaction with the browser.

Although an embodiment of the present invention has been illustrated in the accompanying drawings and described in the foregoing detailed description, it will be understood that the invention is not limited to the embodiment disclosed, but is capable of numerous modifications without departing from the scope of the invention as set out in the following claims.

'Means', as will be apparent to a person skilled in the art, are meant to include any hardware (such as separate or integrated circuits or electronic elements) or software (such as programs or parts of programs) which reproduce in operation or are designed to reproduce a specified function, be it solely or in conjunction with other functions, be it in isolation or in co-operation with other elements. The invention can be implemented by means of hardware comprising several distinct elements, and by means of a suitably programmed computer. In the apparatus claim enumerating several means, several of these means can be embodied by one and the same item of hardware. 'Computer program product' is to be understood to mean any software product stored on a computer-readable medium, such as a floppy disk, downloadable via a network, such as the Internet, or marketable in any other manner.

The invention claimed is:

1. A method of operating apparatus for displaying a plurality of items, the method comprising the acts:

selecting via a selection device, a first item from among a plurality of items displayed on a display device within a first hierarchical level of a plurality of hierarchical levels, wherein respective hierarchical levels of the plurality of hierarchical levels comprising a plurality of sets of items, the respective sets of items comprising at least one item, the respective items of the sets of the hierarchical levels being associated with at least one second item in at least one second hierarchical level, the association comprising the respective items determining respective orders of items of respective sets containing the respective second items of the respective second hierarchical levels, the selected first items being associated with at least two second items of at least two different sets of items of at least one second hierarchical level of the plurality of hierarchical levels;

arranging by a display driver, the at least two respective second sets of the at least two second items of the at least one second hierarchical level, in the order determined by the selected first item of the first hierarchical level, the second hierarchical levels being lower levels than the first hierarchical level; and displaying by the display device, the arranged at least two ordered second sets of second items of the at least one second hierarchical level on a screen;

second selecting via the selection device, one of the displayed at least one second items, the selected second item being associated with at least one third item of at least one third set of items of at least one third hierarchical level of the plurality of hierarchical levels, the at least one respective third hierarchical levels being higher than the at least two respective second hierarchical levels, second arranging by the display driver, for display of third items associated with the selected second item, and displaying on the display device the associated third item highlighted, and positionally listed first.

2. The method of claim 1, wherein the act of arranging by the display driver, at least two sets of second items of at least one second hierarchical level in an order comprises:
arranging by the display driver, the at least two sets of items of the at least one second hierarchical level in an order such that a set comprising items associated with the selected first item within the first hierarchical level is positionally listed first on the screen of the display device.

3. The method of claim 1, wherein the act of displaying by the display device the ordered sets of items comprises:
displaying on the display device, at least some of the items of the first hierarchical level simultaneously with displaying the ordered sets of second items of the at least one second hierarchical level.

4. The method of claim 1, wherein the acts of arranging by the display driver to display at least two sets of second items of the at least one second hierarchical level and displaying by the display device the ordered sets of second items, are automatic upon selection of the selected first item.

5. The method of claim 1, wherein the first hierarchical level and the third hierarchical level are the same.

6. A computer program product comprising a plurality of program code portions, stored on a tangible computer readable medium, that is not a transitory propagating signal or wave, the program code portions for operating apparatus for displaying a plurality of items by carrying out the acts of:
selecting via a selection device, a first item from among a plurality of items displayed on a display device within a first hierarchical level of a plurality of hierarchical levels, wherein respective hierarchical levels of the plurality of levels comprising a plurality of sets of items, the respective sets of items comprising at least one item, the respective items of the sets of the hierarchical levels being associated with at least one second item in at least one second hierarchical level, the association comprising the respective items determining respective orders of items of respective sets containing the respective second items of the respective second hierarchical levels, the selected first item being associated with at least two second items of at least two different sets of items of at least one second hierarchical level of the plurality of hierarchical levels;
arranging by a display driver, the at least two respective second sets of the at least two second items of the at least one second hierarchical level, wherein the order of second items of the at least two respective second sets is in the order determined by the selected first item of the first hierarchical level, the second hierarchical levels being lower levels than the first hierarchical level; and
displaying by a display device, the arranged at least two second ordered sets of items of the at least one second hierarchical level on a screen;
second selecting via the selection device, a displayed second item, the selected second item being associated with at least one third item of at least one third set of third items of at least one third hierarchical level of the plurality of hierarchical levels, the at least one respective third hierarchical levels being a higher level than the at least two respective second hierarchical levels;
second arranging by the display driver, for display of third items in a third hierarchical level higher than the second hierarchical level, with the display of the third item to be highlighted, and positionally listed first on the display device.

7. The computer program product of claim 6, wherein the first hierarchical level and the third hierarchical level are the same.

8. An apparatus for displaying a plurality of items, the apparatus comprising:
a selector device configured for selecting one first item of the displayed items within a first hierarchical level of a plurality of hierarchical levels, respective hierarchical levels of the plurality of hierarchical levels comprising a plurality of sets of items, the respective sets of items comprising at least one item, the respective items of the sets of the hierarchical levels being associated with at least one second item in at least one second hierarchical level, the association determining an order of items of respective sets of the respective second hierarchical levels, the selected first item being associated with at least two second items of at least two different sets of at least one second hierarchical level; and
a display driver configured for arranging the at least two respective second sets of the at least two second items of the at least one second hierarchical level, with the order of items of the at least two respective second sets in the order determined by the selected first item of the first hierarchical level, the second hierarchical levels being lower levels than the first hierarchical level; and
a display device configured for displaying the arranged at least two internally ordered second sets of items of the at least one second hierarchical level on a screen;
the selector device configured to select a second item of the at least one second items of one of the at least two second sets of the at least one second hierarchical level, the selected second item being associated with at least one third item of at least one set of third items of at least one third hierarchical level of the plurality of hierarchical levels, the at least one respective third hierarchical levels being a higher level than the at least two respective second hierarchical levels, and configured to select a third item of the at least one third items;
the display driver configured for arranging to display the selected third item in a hierarchical level, higher than the second hierarchical level, and to display the selected third item as highlighted and positionally listed first on the display device.

9. The apparatus of claim 8, wherein the display driver is configured for arranging at least two sets of second items of at least one second hierarchical level in an order, comprises:
the display driver is configured for arranging the at least two sets of second items of the at least one second hierarchical level in an order such that a set comprising second items associated with the selected first item within the first hierarchical level is positionally listed first on the screen of the display device.

10. The apparatus of claim 8, wherein the display device configured for displaying the ordered sets of second items, comprises:
the display device configured for displaying at least some of the items of the first hierarchical level simultaneously with displaying the ordered sets of second items of at least one second hierarchical level.

11. The apparatus of claim 8, wherein the display driver is configured for arranging at least two ordered sets of second items of the at least one second hierarchical level automatically upon the selection of the first item.

12. A method of operating apparatus for displaying a plurality of items, the method comprising:
displaying on a display device, a plurality of first items of a first hierarchical level of a plurality of hierarchical levels, wherein respective hierarchical levels of the plurality of hierarchical levels comprising a plurality of sets of items, the respective sets of items comprising at least one item, the respective items of the sets of the hierarchical levels being associated with at least one second item in at least one second hierarchical level, the association comprising the respective items determining respective orders of items of respective sets containing the respective second items of the respective second hierarchical levels, the first items being associated with at least two second items of at least two different sets of items of at least one second hierarchical level of the plurality of hierarchical levels;

selecting via a selection device, one of the plurality of first items within the first hierarchical level;

arranging by a display driver, the at least two respective second sets of the at least two second items of the at least one second hierarchical level corresponding to the selected first item, with the order of items of the at least two respective second sets in the order determined by the selected first item, the second hierarchical levels being lower levels than the first hierarchical level; and second selecting via the selection device, a selected second item of the at least one second items of one of the at least two second sets of the at least one second hierarchical level, the selected second selected item being associated with at least one third item of at least one third set of items of at least one third hierarchical level of the plurality of hierarchical levels, the at least one respective third hierarchical levels being higher than the at least two respective second hierarchical levels, and selecting a third item of the at least one third items;

second arranging by the display driver, for display of the third items in a third hierarchical level, higher than the second hierarchical level, with the display of the selected third item to be highlighted, and positionally listed first on the display device.

13. The method of claim 12, wherein the act of arranging by the display driver, at least two sets of second items of at least one second hierarchical level in an order comprises:
arranging by the display driver, the at least two sets of items of the at least one second hierarchical level in an order such that a set comprising items associated with the selected first item within the first hierarchical level is positionally listed first on the screen of the display device.

14. The method of claim 12, wherein the act of displaying by the display device the ordered sets of items comprises:
displaying on the display device, at least some of the items of the first hierarchical level simultaneously with displaying the ordered sets of second items of the at least one second hierarchical level.

15. The method of claim 12, wherein the acts of arranging by the display driver at least two sets of second items of the at least one second hierarchical level and displaying by the display device the ordered sets of second items, are automatic upon selection of the selected first item.

16. An apparatus for preparing a plurality of items to be displayed, the apparatus comprising:
a display device configured for display a plurality of first items within a first hierarchical level of a plurality of hierarchical levels, respective hierarchical levels of the plurality of hierarchical levels comprising a plurality of sets of items, the respective sets of items comprising at least one item, the respective items of the sets of the levels being associated with at least one second item in at least one second hierarchical level, the association an order of items of respective sets containing the respective second items of the respective second hierarchical levels, the first items being associated with at least two second items of at least two different sets of at least one second a selector device configured for selecting one first item of at least one first items within the first hierarchical level; and a display driver configured for arranging and displaying of the display device, the at least two respective second sets of the at least two second items of the at least one second hierarchical level corresponding to the selected first item, in the order determined by the selected first item of the first hierarchical level, the second hierarchical levels being lower levels than the first hierarchical level; and the selector device configured for:
selecting a second item of the at least one second items of one of the at least two second sets of the at least one second hierarchical level, the selected second item being associated with at least one third item of at least one set of third items of at least one third hierarchical level of the plurality of hierarchical levels, the at least one respective third hierarchical level being a higher level than the at least two respective second hierarchical levels, and
selecting a third item of the at least one third items; and
the display driver is configured for arranging and displaying on the display device the selected third item wherein the selected third item is highlighted and positionally listed first.

17. The apparatus of claim 16, wherein the display driver is configured for arranging at least two sets of second items of at least one second hierarchical level in an order, comprises:
the display driver configured for arranging the at least two sets of second items of the at least one second hierarchical level in an order such that a set comprising second items associated with the first selected item is positionally listed first on the screen of the display device.

18. The apparatus of claim 16, wherein the display device configured for displaying the ordered sets of second items, comprises:
the display device configured for displaying at least some of the items of the first hierarchical level simultaneously with displaying the ordered sets of second items of at least one second hierarchical level.

19. The apparatus of claim 16, wherein the display driver is configured for arranging at least two ordered sets of second items of the at least one second hierarchical level automatically upon the selection of the first selected item; and the display device is configured to display the two ordered sets of second items automatically upon the selection of the first selected item.

* * * * *